US005151716A

United States Patent [19]

Kanemitsu

[11] Patent Number: 5,151,716

[45] Date of Patent: Sep. 29, 1992

[54] RECORDING APPARATUS FOR COMPENSATING FOR ECCENTRICITIES IN DRIVE FORCE TRANSMISSION MEANS

[75] Inventor: Shinji Kanemitsu, Yokohama, Japan

[73] Assignee: Canon Kabushiki Kaisha, Tokyo, Japan

[21] Appl. No.: 658,591

[22] Filed: Feb. 21, 1991

[30] Foreign Application Priority Data

Feb. 26, 1990 [JP] Japan .................................. 2-042514

[51] Int. Cl.[5] .............................................. G01D 15/24

[52] U.S. Cl. ........................... 346/140 R; 346/139 R; 400/320

[58] Field of Search ........... 346/140 R, 139 A, 139 R; 400/82, 149, 320, 335

[56] References Cited

U.S. PATENT DOCUMENTS 4,313,124 1/1982 Hara .................................. 346/140 R
4,345,262 8/1982 Shirato et al. .................. 346/140 R
4,459,600 7/1984 Sato et al. ....................... 346/140 R
4,463,359 7/1984 Ayata et al. ......................... 346/1.1
4,540,996 9/1985 Saito ................................ 346/140 R
4,558,333 12/1985 Sugitani et al. ................. 346/140 R
4,723,129 2/1988 Endo et al. .......................... 346/1.1
4,740,796 4/1988 Endo et al. .......................... 346/1.1
4,760,408 7/1988 Kanayama ....................... 346/140 R
4,965,593 10/1990 Hickman ......................... 346/140 R

FOREIGN PATENT DOCUMENTS 54-56847 5/1979 Japan .
59-123670 7/1984 Japan .
59-138461 8/1984 Japan .
60-71260 4/1985 Japan .

*Primary Examiner*—Benjamin R. Fuller
*Assistant Examiner*—Alrick Bobb
*Attorney, Agent, or Firm*—Fitzpatrick, Cella, Harper & Scinto

[57] ABSTRACT

A recording apparatus for performing recording on a recording medium repeatedly includes a plurality of recording heads each capable of conducting recording on the recording medium, a carriage incorporating the plurality of recording heads, a motor for generating a driving force, and a driving force transmission device for transmitting the driving force from the motor to the carriage to move the carriage in a predetermined direction. The spacings between the plurality of recording heads are made substantially equal to either the distance through which the plurality of recording heads are moved in one transmission period of the driving force transmission device or an integral multiple of that distance.

11 Claims, 8 Drawing Sheets

RECORDING APPARATUS FOR COMPENSATING FOR ECCENTRICITIES IN DRIVE FORCE TRANSMISSION MEANS

BACKGROUND OF THE INVENTION

1. Field of the Invention

The present invention relates to a recording apparatus for conducting recording on a recording medium, and more particularly, to a so-called serial type recording apparatus for conducting recording by the movement of a recording head.

2. Description of the Related Art

FIG. 1 shows an example of a conventional recording apparatus.

The recording apparatus shown in FIG. 1 is of the ink jet type. An ink jet recording head 101 is mounted on a carriage 102 which is capable of moving back and forth in the direction indicated by an arrow in FIG. 1. The carriage 102 is connected through its connection portion 102A to a driving belt 106 extending between a driving pulley 104 fixed to a rotary shaft of a driving motor 103 and an idler pulley 105 disposed on the side of the apparatus remote from the driving pulley 104. Through this connection the carriage 102 is moved back and forth along a sliding rail 107 in accordance with the forward and reverse rotations of the driving motor 103. During the movement of the carriage 102, the recording head 101 conducts recording by ejecting ink onto a sheet of recording paper 108 which is conveyed by means of a convey roller 109.

In the manufacture of the driving and idler pulleys in the above-described recording apparatus, eccentricity or imperfect roundness is unavoidable, given the today's manufacturing technologies. In the conventional recording apparatus, this eccentricity or the like may generate nonuniformity in the speed at which the driving belt 106 travels, which leads to generation of recording irregularities that cannot be ignored in a case where the degree of eccentricity or non-circularity exceeds a predetermined limit. In the case of a printer with a single recording head, such as that shown in FIG. 1, i.e., a printer for recording in a single color, such recording irregularities are not often so readily noticeable and are thus acceptable.

In recent years, as color display of personal computers or the like has become popular, there has been an increasing demand for printers capable of color recording. In such printers, recording heads 101A to 101D, each corresponding to one of a plurality of colors, are mounted on the carriage 102, as shown in FIG. 2. These colored inks are placed on top of one another to form, for example, a single pixel, by which full-color recording is performed. Generally, recording heads for four colors, cyan, magenta, yellow and black, are provided in full-color recording. In the case where colored inks are placed on top of one another, the above-described recording irregularities appear in the form of color misalignment, which is relatively clearly noticeable to a viewer.

Recording irregularities and color misalignment, caused by an eccentric pulley, will now be described below.

FIG. 3 schematically shows how the driving belt 106 is moved by the rotation of the driving and idler pulleys 104 and 105 which are completely round and which are not eccentric. When the driving pulley 104 rotates 180 degrees from position 'a' to position 'b', the point on the driving belt 106, located at position 'A', moves to position "B". With rotation of the driving pulley by another 180 degrees, the point on the driving belt 106 further moves to position 'C', whereby one revolution of the driving pulley 104 is completed.

At that time, if the pulleys are not eccentric, the distance between positions A and B is equal to the distance between positions B and C, and the speed at which the driving belt 106 travels is maintained constant when the driving pulley 104 rotates at a constant speed. Hence, an image having no color misalignment can be recorded by means of the recording heads which conduct recording at predetermined time intervals.

Next, the case in which the driving pulley 104 is eccentric in an amount of '$\alpha$' will be described with reference to FIG. 4.

First, it is assumed that the driving pulley 104 is located at the position indicated by a solid line in FIG. 4. The driving belt 106 is wound around the pulley 104 past the position indicated by 'al', and position A shown in FIG. 3 is shifted to the right when compared with the case when the pulleys are completely round and not eccentric. In this case, the actual length of the belt between the two pulleys varies, and tension of the belt thus varies, thereby generating elongation or compression of the belt or displacement of the portion which rotatably supports the pulley. Based on the experimentation, the amount of the above-noted shift is approximately $\alpha/2$.

When the driving pulley 104 rotates 180 degrees from the above-described position, the driving belt 106 is wound around the pulley 104 past the position indicated by 'bl'. At that time, a point on the belt located at position 'A', which is supposed to reach position 'B', as shown in FIG. 3, moves due to the eccentricity to a position shifted from normal position 'B' to the left by $\alpha/2$. When the driving pulley 104 rotates another 180 degrees and thus makes one complete rotation, a point on the belt located at position 'A' moves to a position shifted from normal position 'C' to the right by $\alpha/2$.

FIG. 5 is a positional discrepancy diagram, in which the ordinate axis represents positional discrepancy from the normal position of the belt obtained when eccentricity does not exist (rightward discrepancy has a positive sign), while the abscissa axis represents the normal position at which the belt is supposed to be located.

The comparison made between the results of the recording conducted using the belt which generates positional discrepancy and the results of the recording conducted using the belt which is free from eccentricity (this recording being hereinafter referred to as normal recording) is shown in FIG. 6. FIG. 6 schematically shows the positions at which ink dots are formed in normal recording and in the recording conducted using the eccentric pulley. As is clear from FIG. 6, nonuniformity in the recording density occurs in accordance with the rotational period of the driving pulley 104 in the recording conducted using the eccentric pulley.

The positional offset which occurs when the recording apparatus employing a plurality of recording heads is used (two heads for the convenience of explanation) will be described below with reference to FIG. 7.

It is assumed in the apparatus shown in FIG. 7 that two heads 101A and 101B are mounted on the carriage 102 apart from each other by a distance l, that the distance through which the carriage 102 is moved by one revolution of the driving pulley 104 is L (which is equal to the length between point A and point C on the sheet of recording paper 108), and that the relationship between l and L is expressed by $l=L/2$. When the pulley is not eccentric, the head 101A ejects ink to form a dot when it reaches point A as a consequence of rotation of the driving pulley 104. Thereafter, the head 101B ejects ink when the driving pulley 104 further rotates and the head 101A thereby reaches point B, by which dots can be formed on top of each other at the same point A.

However, in a case where eccentricity $\alpha$ is present on the driving pulley 104, the dots recorded by means of the head 101A shift from their regular positions, and recording shown in FIG. 6 is thus conducted. At that time, the positions of the dots formed by means of the head 101B also shift. The phase of the positional discrepancy generated by the head 101B is different from the phase of the positional discrepancy generated by the head 101A by a distance l between the two heads, as shown in FIG. 8.

That is, since the distance l between the two heads is equal to one half of the distance through which the carriage 102 is moved by one rotation of the pulley (the distance between points A and B), the head 101B ejects an ink at the instance the driving pulley 104 has rotated by 180 degrees after the ejection of the ink from the head 101A. Hence, the positional discrepancy of the dot formed by the head 101B is equal to the positional discrepancy of the dot recorded by the head 101A at point 'B'. In other words, the positional discrepancies generated by the heads 101A and 101B are out of phase by the distance l.

At point 'A', the dot formed by the head 101A is offset from the dot formed by the head 101B by '$\alpha$' since discrepancy of the dot formed by the head 101A is $+\alpha/2$ and discrepancy of the dot formed by the head 101B is $-\alpha/2$. In a case where the amount of eccentricity of the driving pulley is 30 μm, the positional offset which occurs at point 'A' is 30 μm. In practice, the positional offset is also affected by the eccentricity of the idler pulley 105 and thus tends to be increased.

The pixel density of the available full-color printers is, in general, 360 to 400 dots per inch, which is 70.6 to 63.5 μm in terms of the distance between the adjacent dots. When the aforementioned positional offset occurs in such a printer, characters may be recorded in slightly different tints or may appear in a blurred state.

SUMMARY OF THE INVENTION

A primary object of the present invention is to provide a recording apparatus which is capable of recording vivid images.

Another object of the present invention is to provide a recording apparatus which is capable of performing color recording which is free from color misalignment.

Another object of the present invention is to provide a recording apparatus in which the spacings between a plurality of recording heads are made substantially equal to, for example, the distance through which the head moves per one revolution of a pulley or to an integral multiple of that distance in order to eliminate offset of the recording positions of the individual recording heads or to minimize the positional offset which occurs when recording is repeatedly performed by means of the plurality of recording heads.

Another object of the present invention is to provide a recording apparatus for performing recording on a recording medium at the same position by a plurality of recording heads. The recording apparatus comprises a carriage for incorporating the plurality of recording heads, driving force transmission means for transmitting a driving force to the carriage to move the carriage, the transmission means being movable in transmission periods or fractions thereof, and a motor for generating the driving force to be transmitted to the driving force transmission means. In this recording apparatus, the spacings between the plurality of recording heads are made substantially equal either to the distance through which the heads are moved in one transmission period of the driving force transmission means or to an integral multiple of that distance.

BRIEF DESCRIPTION OF THE DRAWINGS

FIG. 9 (B) is a perspective view of the ink jet recording apparatus of FIG. 9 (A);

DETAILED DESCRIPTION OF THE PREFERRED EMBODIMENTS

An embodiment of the present invention will now be described below with reference to the accompanying drawings.

In the following embodiment, the spacings of the plurality of recording heads are made substantially equal to, for example, either the distance through which the head is moved by one revolution of a pulley or an integral multiple of that distance. Consequently, discrepancies of the recording positions which are generated by the individual recording heads due to the eccentricity of the pulley or the like are the same or substantially the same at the same position on a recording medium.

Figure 1:
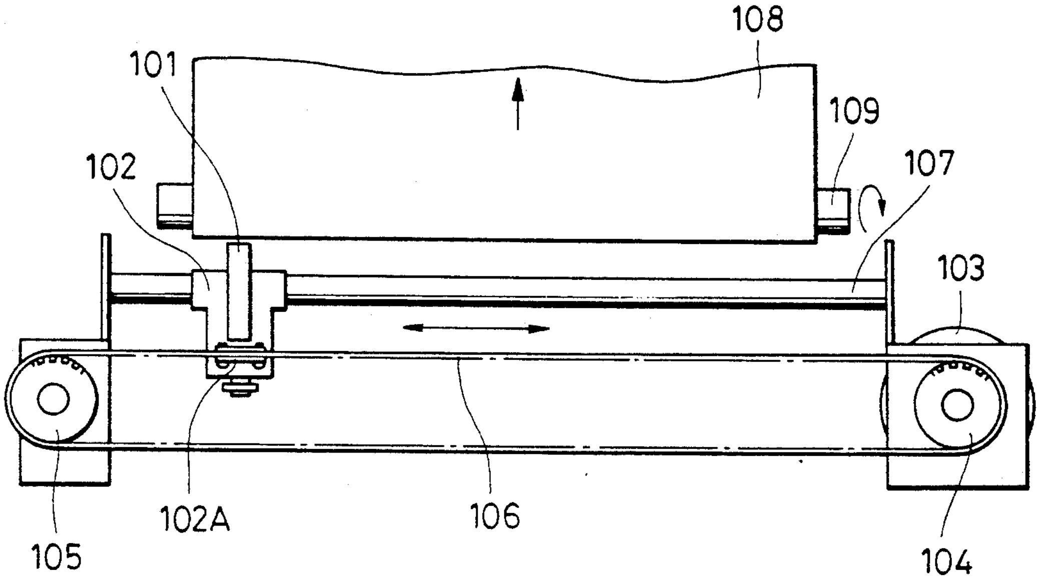
FIG. 1 PRIOR ART
FIG. 1 is a schematic top plan view of an ink jet recording apparatus with a single recording head.
Figure 2:
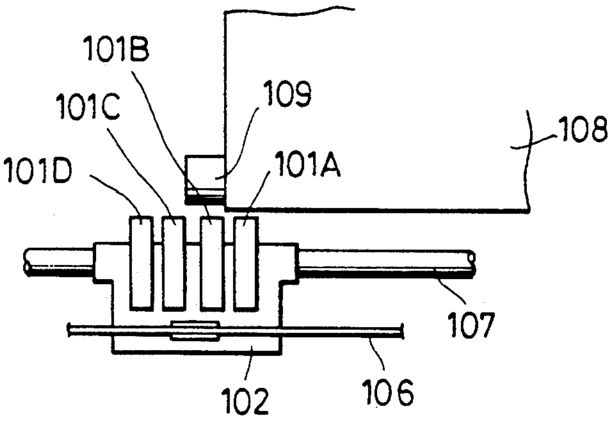
FIG. 2 PRIOR ART
FIG. 2 is a schematic top plan view of a recording head portion of an ink jet recording apparatus with a plurality of recording heads.
Figure 3:
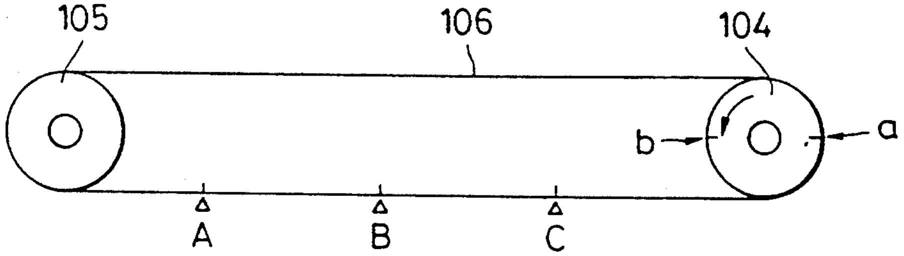
FIG. 3 PRIOR ART
FIG. 3 is a schematic front view showing the relationship between the travel of a carriage driving belt and the rotation of a belt driving pulley.
Figure 4:
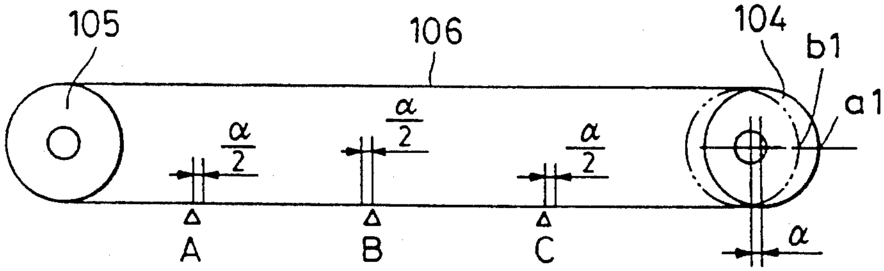
FIG. 4 PRIOR ART
FIG. 4 is a schematic front view showing the positional discrepancies which occur on the driving belt when the belt driving pulley is eccentric.
Figure 5:
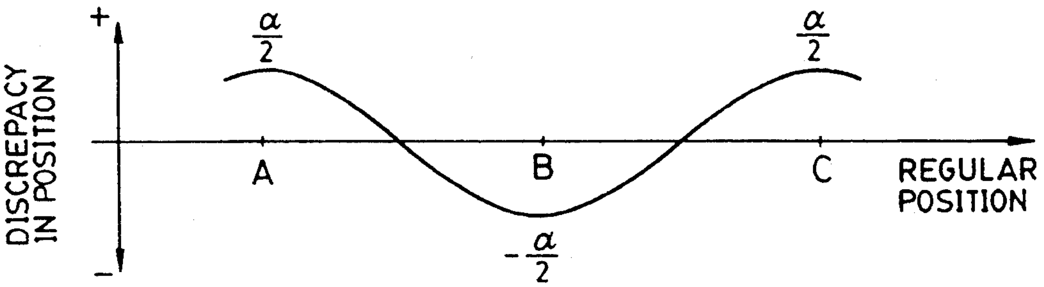
FIG. 5 PRIOR ART
FIG. 5 is a diagram showing the positional discrepancies of the recording head which are generated by the driving system shown in FIG. 4.
Figure 6:
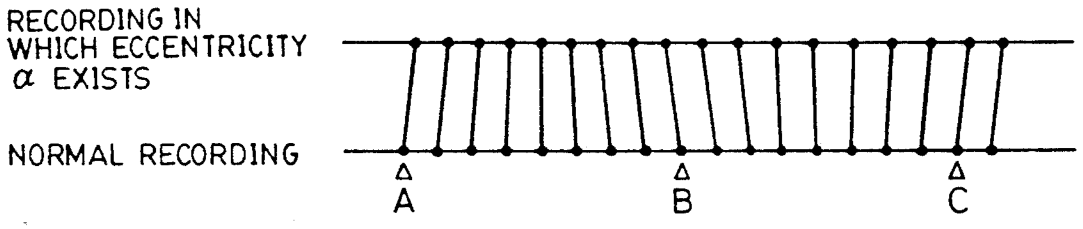
FIG. 6 PRIOR ART
FIG. 6 schematically shows the discrepancies of the recording positions.
Figure 7:
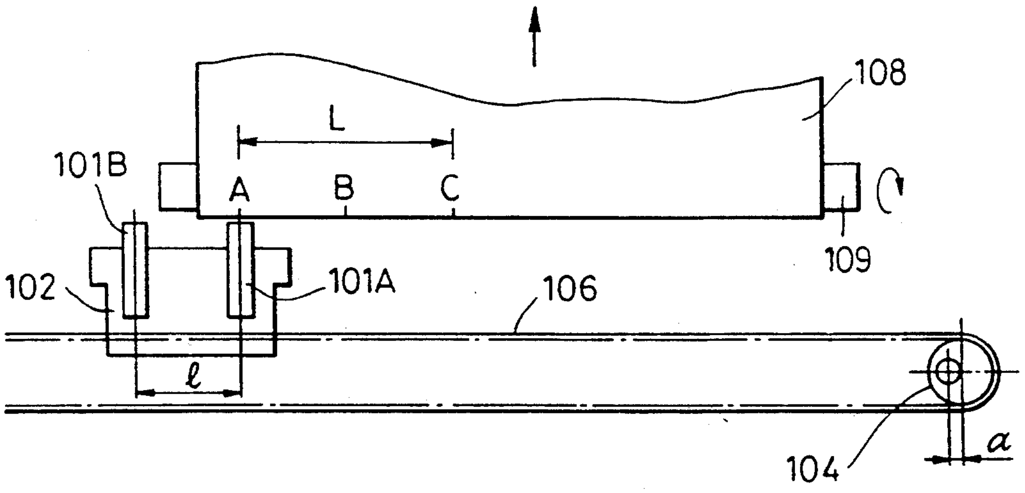
FIG. 7 PRIOR ART
FIG. 7 is a schematic top plan view of a conventional ink jet recording apparatus.
Figure 8:
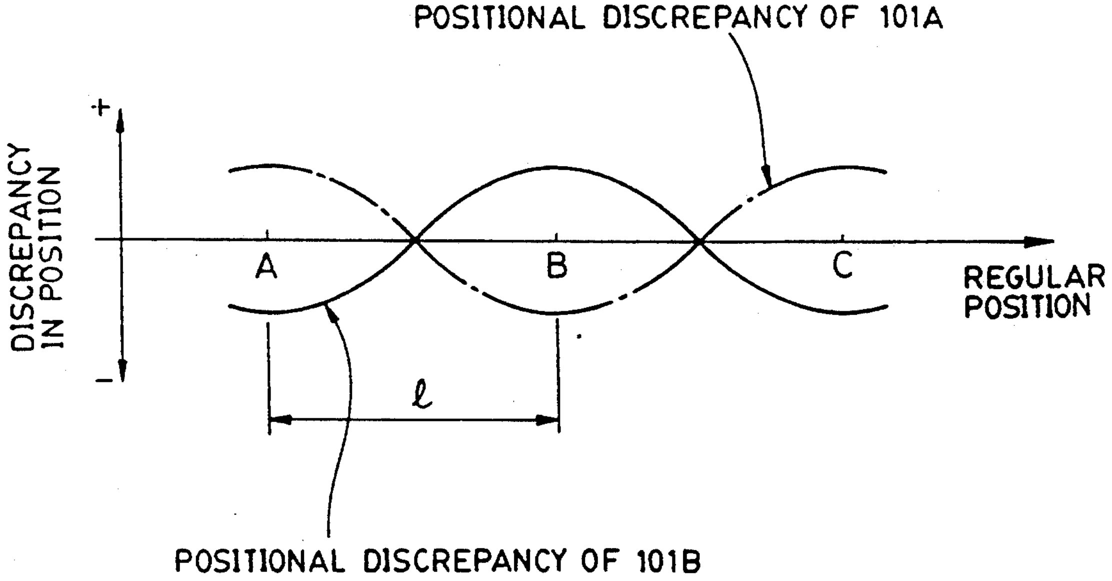
FIG. 8 PRIOR ART
FIG. 8 is a diagram showing the discrepancies of the recording positions which occur with the recording heads of the conventional recording apparatus of FIG. 7.
Figure 9A:
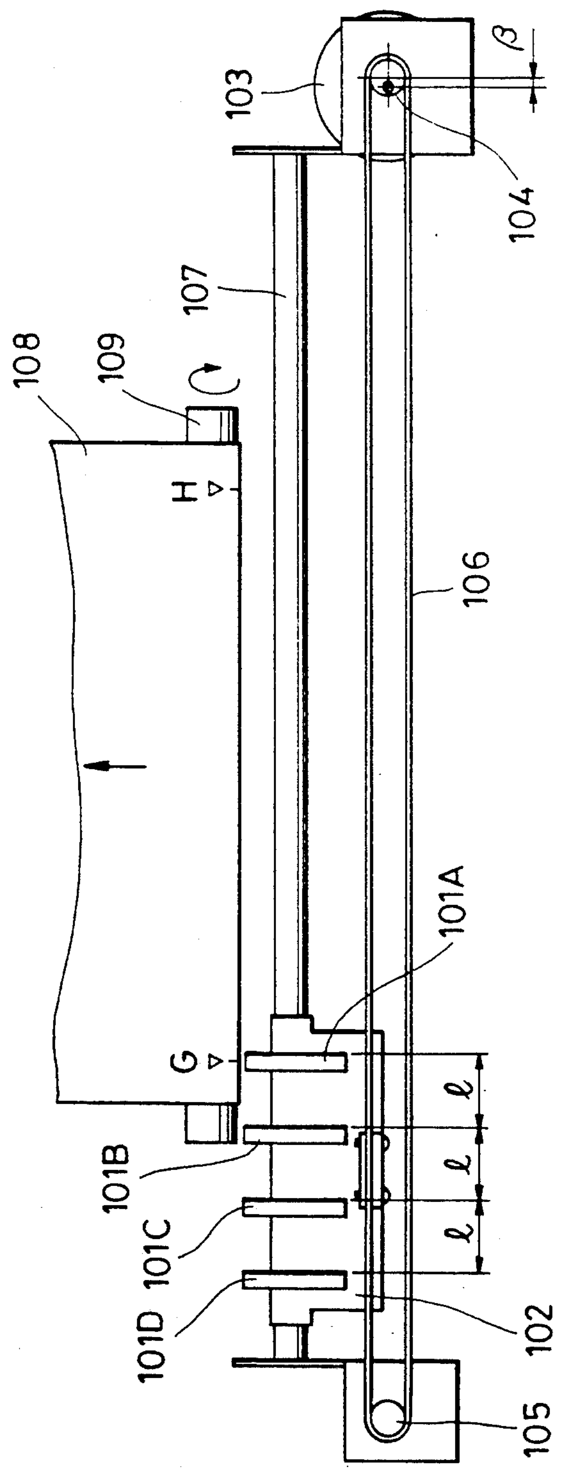
FIG. 9 (A) is a schematic top plan view of a first embodiment of an ink jet recording apparatus according to the present invention.
Figure 9B:
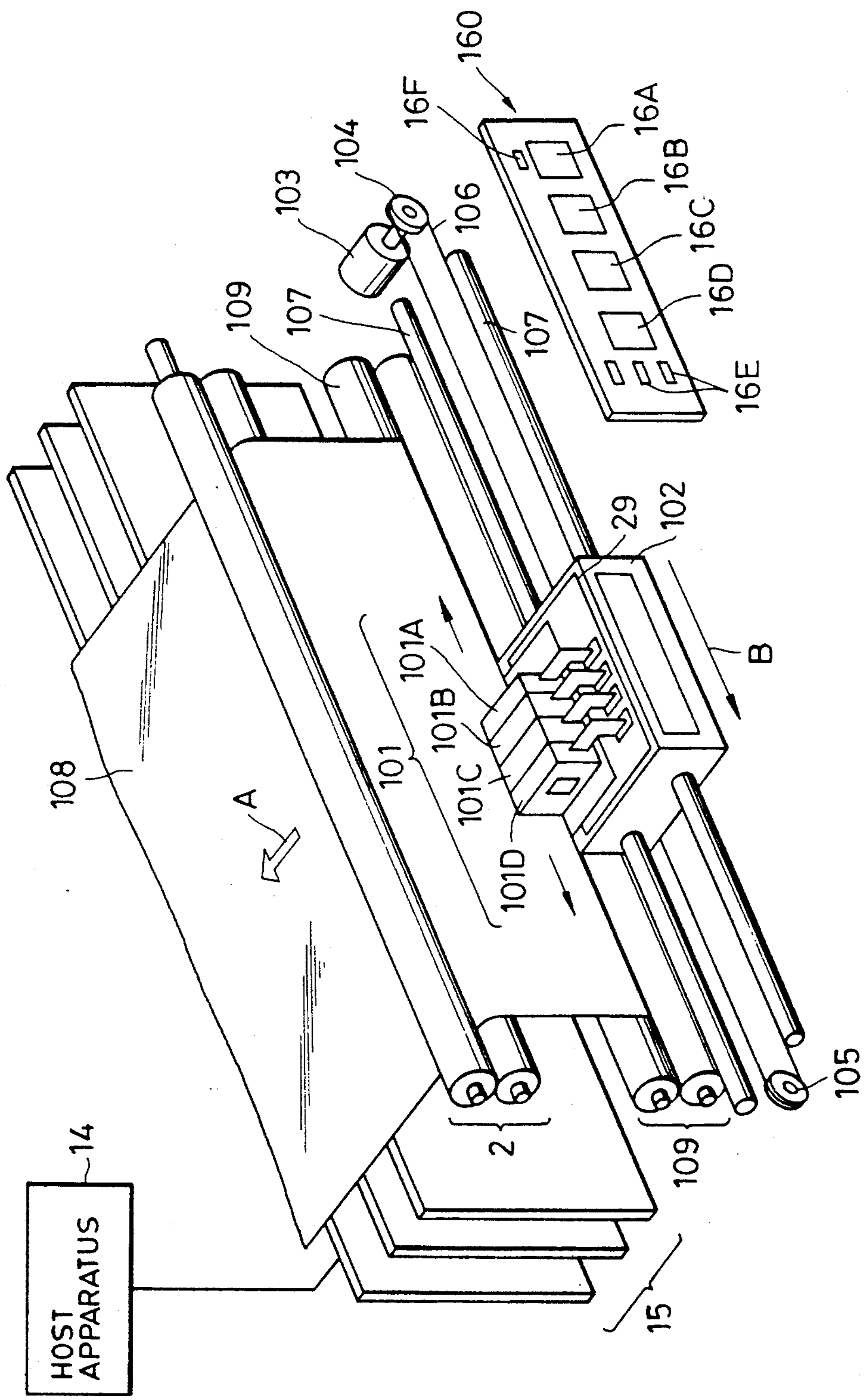

FIG. 9 (A) is a schematic top plan view of an ink jet recording apparatus, and FIG. 9 (B) is a perspective view thereof. The same reference numerals are used to denote elements which are the same as those shown in FIGS. 1 to 8, the description thereof being partially omitted.

The recording heads 101A to 101D respectively correspond to cyan, magenta, yellow and black colored ink. The recording heads 101A and 101D are mounted on the carriage 102 in such a manner that they are separated from each other by a distance l between the ejection ports of the individual heads. The driving pulley 104 and the idler pulley 105 have diameters which ensure that one revolution of the pulleys moves the carriage 102 through the driving belt 106 by the distance l, which is the same as the distance between the ejection ports of the heads. The range of movement of the carriage 102 is set such that recording is capable of being carried out by means of the individual recording heads 101A to 101D on the sheet of recording paper 108 from point G to point H.

Figure 10:
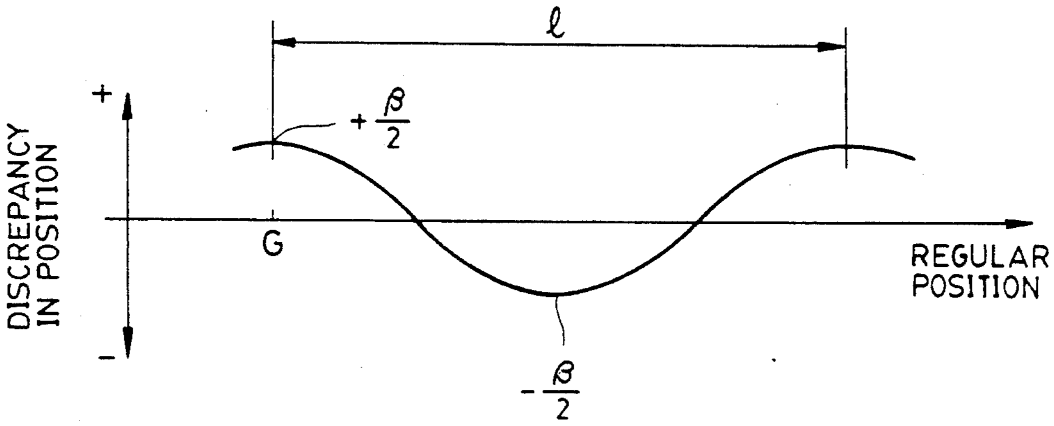
FIG. 10 is a diagram showing the discrepancies of the recording positions which are generated by the movement of the recording heads in the recording apparatus of FIG. 9 (A)

It is now assumed that the driving pulley 104 is eccentric, that the amount of eccentricity is $\beta$, and that the discrepancy of the position of the head 101A is at a maximum when the head 101A is at position G where recording is started. The diagram of discrepancy of the recording position of the head 101A is similar to that shown in FIG. 5 and is shown in FIG. 10. Discrepancies of the recording positions generated by the individual recording heads 101B to 101D are each out of phase by the distance l. As a result, the period of discrepancy of the recording positions generated by the individual recording heads corresponds to the distance l, as is clear from FIG. 10, and discrepancies of all the recording heads thus are the same at the same position on the recording paper.

In other words, offset does not occur during the recording carried out by the four recording heads. Only non-uniformity in the recording density of the individual recording beads shown in FIG. 6 occurs due to the eccentricity in the same period as that of the rotation of the pulley.

The distance through which the carriage 102 is moved by one revolution of the idler pulley 105 through the belt 106 is also set to l. Consequently, the period of the composite discrepancy generated by the eccentric driving and idler pulleys 104 and 105 also corresponds to the distance l, and no offset occurs between the individual recording heads.

FIG. 9 (B) shows a color ink jet recording apparatus which adopts a BJ ink jet recording process which employs as an ejection energy generation means an electrothermal conversion member and in which recording is conducted by ejecting ink utilizing heat energy.

In FIG. 9 (B), a sheet of paper or a plastic sheet 108 is supported and conveyed in a direction indicated by an arrow A by a pair of convey rollers 2 provided at the upper portion of a recording area and by a pair of convey rollers 109 disposed at the lower portion of the recording area. The convey rollers 2 and 109 are driven by a sheet feeding motor. In front of the convey rollers 2 and 109, a guide shaft 107 is provided parallel thereto. The carriage 102 is moved back and forth in the direction indicated by an arrow B along the guide shaft 107 by means of the output of a carriage motor 103 through a belt 106.

On the carriage 102 is mounted the BJ type ink jet recording head unit 101, which consists of four recording heads 101A to 101D for recording images in colors. The recording heads 101A to 101D are disposed in the direction of scanning and respectively correspond to cyan (C), magenta (M), yellow (Y), and black (BK) colored ink. On the front surface of each recording head 101, i.e., on the surface of the recording head 101 which opposes the recording medium 108 with a predetermined gap (for example, 0.08 mm) therebetween, is provided a recording portion on which a plurality of ink ejecting ports (for example, eight ports) are aligned in one row in the vertical direction. In the recording heads 101 (which includes the recording heads 101A to 101D), an electrothermal conversion member (heat generating resistor or the like) provided for each of the plurality of ink ejecting ports aligned at a predetermined pitch in the vertical direction is driven (energized and heated) on the basis of recording information to generate a bubble in the ink. An ink droplet is formed utilizing the pressure generated by the bubble, and the formed ink droplet is attached to the recording medium 108 in a predetermined pattern for recording.

To the recording heads 101 is attached a circuit board of driving circuits (driver) 29 for conducting the above-described driving operation. A control unit, including a control circuit (CPU) of the recording apparatus, a ROM, a RAM and so on, is provided on a control board 15. The control unit receives instruction signals or data signals (recording information) from a host apparatus 14, such as a computer, and applies, together with the driving source, such as various types of motors, an electrothermal conversion member driving voltage (heat voltage) to the individual recording heads 101A to 101D through the heat driver on the basis of the signals received from the host apparatus 14. On an operation panel 160 mounted on a case (not shown) attached to the recording apparatus is provided a key setting unit, including an online/offline switch-over key 16A, a line feed key 16B, a form feed key 16C and a recording mode switch-over key 16D. A display unit is also provided on the operation panel, including alarm lamps 16E and a power source lamp 16F. In the color ink jet recording apparatus shown in FIG. 9 (B), the distance between the ejection ports of the adjacent recording heads is l, and the pulleys 104 and 105 have a diameter which ensures that one revolution thereof, that is, one transmission period, moves the carriage 102 through the belt 106 by the distance l, as in the case shown in FIG. 9 (A). During recording, the pulleys 104 and 105 are moved in transmission periods or fractions thereof.

Figure 11:
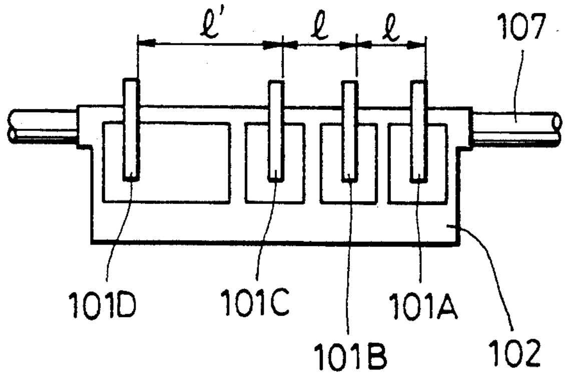
FIG. 11 is a schematic top plan view of a recording head portion of the ink jet recording apparatus, showing another embodiment of the present invention.

FIG. 11 is a schematic top plan view of a recording head portion showing an embodiment in which the distance between the ejecting ports of the plurality of recording heads is not even. In a case of a full-color recording apparatus where recording in black is more frequently performed than in the other colors, the amount of black ink consumed is substantially larger than the other colors. In order to cope with this, the overall size of the cassette which accommodates the black ink may be increased, including the width, which is parallel to the direction in which the recording head is moved, as shown in FIG. 11. In other words, the distance $l' > l$. In that case, if $l' = nl$, where l is the distance through which the head moves by one revolution of the pulley, as stated above, and n is an integer, the difference in phase between the discrepancy of the recording position of the head 101D and the discrepancy of the recording position of the head 101C becomes equal to n periods. No offset of the recording positions thus occurs among the individual recording heads.

Figure 12:
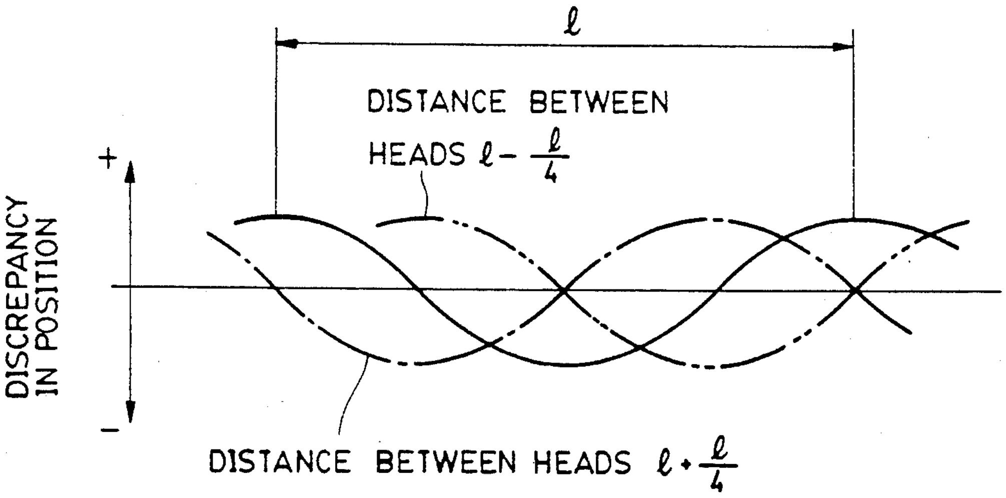
FIG. 12 is a diagram showing offset of the recording positions which occurs between the recording heads in the embodiment shown in FIG. 11.

In the above-described embodiments, the distance l between the heads completely coincides with the distance l through which the head moves by one revolution of the pulley. However, offset of the recording position between the recording heads may be reduced to about one half of the eccentricity of the pulley so as to make recording non-uniformity generated by the offset acceptable by setting the distance between the heads to l±l/4, which assures the positional discrepancy shown in FIG. 12.

In the above-described examples, discrepancy of the recording position occurred due to the eccentricity of the rotary shaft of the pulley. However, the same effect can be obtained even when the pulley is not completely round.

Furthermore, the above embodiments employ as the recording apparatus the ink jet recording apparatus. However, the recording process of the present invention is not limited to ink jet recording, and can also be applied to a recording apparatus which adopts thermal or impact recording processes. In such cases, the recording element may be a heat generating element of a thermal head, a wire or a hammer.

In the case where the present invention utilizes the ink jet recording process, an ink jet recording head or apparatus of the type which ejects ink utilizing heat, proposed by Canon Inc. is preferred, because such ink jet process ensures high density and high definition of recording.

Preferable configurations and principles of such ink jet recording heads or apparatuses are described in, for example, U.S. Pat. Nos. 4,723,129 and 4,740,796. Although this ink jet process can be applied to both on-demand type and continuous type, it is preferable for it to be applied to the on-demand type. In the on-demand type recording head, at least one driving signal for increasing the temperature of the electrothermal conversion element to a value exceeding the nuclear boiling temperature of ink is applied in response to recording information driving signals applied to each of the electrothermal energy conversion elements. The conversion elements are disposed in such a manner as to face a liquid (ink) holding sheet or a liquid passage so as to generate thermal energy and thereby cause film boiling to occur on the heat acting surface of the recording head. Bubbles are thereby formed in the liquid (ink) in one-to-one correspondence with the driving signals applied to the electrothermal conversion elements. The liquid (ink) is ejected from the outlet due to the growth and contraction of the bubble to form at least one droplet. At that time, the use of a driving signal having a pulse-like form is preferred because the pulse-like driving signal causes the bubble to grow and contract instantaneously and adequately, and liquid (ink) can therefore be ejected in excellent response. Driving of the recording head by means of a pulse-like signal has been proposed in, for example, U.S. Pat. Nos. 4,463,359 and 4,345,262. If the conditions described in U.S. Pat. No. 4,313,124, which involves an increase in the temperature of the heat acting surface of the recording head, are adopted, better recording is possible.

The recording head that can be employed in the present invention may be of the type in which the outlets, the liquid passages (linear or bending) and the electrothermal energy conversion elements are provided in one-to-one correspondence, like those disclosed in the aforementioned specifications: of the type in which the heat acting surface is disposed in a bending area, like those disclosed in U.S. Pat. Nos. 4,558,333 and 4,459,600; of the type in which a slit is formed as the common outlet for a plurality of electrothermal energy conversion elements, like that disclosed in Japanese Patent Laid-Open No. 123670/1984; or of the type in which an opening for absorbing the pressure wave of the thermal energy is formed for each outlet, like that disclosed in the specification of Japanese Patent No. 138461/1984. In other words, the present invention assures effective recording regardless of the configuration of the recording head.

The serial type recording head that can be used in the present invention may be of the chip type, which is replaceable and which accomplishes electrical and ink supply connections to the apparatus body by the mounting thereof on the apparatus body, or of the cartridge type in which a cartridge is formed integrally with the recording head.

Preferably, recording head restoring means and auxiliary means may be incorporated in the recording apparatus according to the present invention for the purpose of ensuring more stable recording. Suitable examples of such means include a capping means, a cleaning means and pressurizing or suction means for the recording head, a preliminary heating means which employs the electrothermal energy conversion elements, other heating elements or combinations of electrothermal energy conversion elements and other heating elements, and a preliminary discharge means for performing discharge for purposes other than recording an image.

A plurality of recording heads may be provided, each corresponding to one ink having one color or concentration among a plurality of inks.

The recording apparatus according to the present invention may be in the form of an image output terminal for an information processing machine such as a computer, a copier combined with a reader or the like, or a facsimile machine having transmission and reception function.

In the above-described embodiments, the ink has been described as liquid ink. However, an ink which is in solid form at or below room temperatures and which softens or is liquid at room temperatures, may also be used. Alternatively, an ink which is in liquid form when a recording signal is applied thereto may also be used because control of the temperature of the ink used in the ink jet process generally ranges from 30° C. to 70° C. so as to adjust the viscosity of the ink to a predetermined range which ensures stable ejection. In the present invention, an ink which is liquefied by the presence of thermal energy, such as that which is liquefied in response to a recording signal, and is ejected in the form of liquid ink or that which starts solidifying when it reaches the recording medium, may also be used. The solid ink which is liquefied by the application of thermal energy in response to the recording signal is used for two purposes. First, it prevents an excessive increase in the temperature of the ink due to the thermal energy generated by the recording signals by using that thermal energy as the energy required for the ink to change from a solid state to a liquid state. Second, it prevents evaporation of the ink during storage. Such an ink may be disposed in opposed relation to the electrothermal conversion elements in a recessed portion of a porous sheet or in through-holes in liquid or solid state, like those described in Japanese Patent Laid-Open Nos. 56847/1979 and 71260/1980. The present invention can be carried out most effectively using the above-described inks when the film boiling type recording process is used.

As will be understood from the foregoing description, the spacings between the plurality of recording heads are made substantially equal to either, for example, the distance through which the head is moved by one revolution of a pulley or an integral multiple of that distance. Consequently, discrepancies of the recording positions of the individual recording heads due to any eccentricity of the pulley or the like are the same or substantially the same at the same position of a recording medium.

As a result, in the case of full-color recording, it is possible to obtain vivid recording which is free from color misalignment.

What is claimed is:

1. A recording apparatus for performing recording on a recording medium, said recording apparatus comprising:

- a plurality of recording heads each for conducting recording on the recording medium;
- a carriage for mounting said plurality of recording heads at predetermined spacings;
- a motor for generating a driving force; and
- driving force transmission means for transmitting the driving force from said motor to said carriage to move said carriage in a predetermined direction, said driving force transmission means being movable in transmission periods or fractions thereof, one transmission period corresponding to one period of movement of said transmission means beginning with a reference position and returning to the reference position,
- wherein the spacings between said plurality of recording heads are made substantially equal either to a distance through which said plurality of recording heads are moved in one transmission period of said driving force transmission means or to an integral multiple of said distance.

2. The recording apparatus according to claim 1, wherein each of said recording heads comprises an ink jet head which has an ejection port through which ink is ejected for recording.

3. The recording apparatus according to claim 1, wherein each of said recording heads comprises an ink jet head which has an ejection port through which ink is ejected utilizing thermal energy generated by an electrothermal conversion element.

4. The recording apparatus according to claim 1, wherein said plurality of recording heads respectively perform recording in yellow, magenta, cyan and black colors.

5. The recording apparatus according to claim 1, wherein said driving force transmission means includes a belt connected to said carriage, and a pulley for driving said belt, and wherein the spacings between said recording heads are substantially made equal either to the distance through which the recording heads are moved by one revolution of said pulley or to an integral multiple of said distance.

6. A recording apparatus for performing overlapping recording on a recording medium by the movement of a plurality of recording heads, said recording apparatus comprising:

- a carriage on which said plurality of recording heads are mounted at predetermined spacings;
- driving force transmission means for transmitting a driving force to said carriage to move said carriage, said drive force transmission means being movable in transmission periods or fractions thereof, one transmission period corresponding to one period of movement of said transmission means beginning with a reference position and returning to the reference position;
- a motor for generating the driving force to be transmitted by said driving force transmission means,
- wherein the spacings between said plurality of recording heads are made substantially equal either to a distance through which said plurality of recording heads are moved in one transmission period of said driving force transmission means or to an integral multiple of said distance.

7. The recording apparatus according to claim 6, wherein said driving force transmission means includes a belt partially connected to said carriage, and a driving pulley for driving said belt, and wherein the spacings between said recording heads are substantially made equal to the distance through which the recording heads are moved by one revolution of said driving pulley or to an integral multiple of said distance.

8. The recording apparatus according to claim 7, further comprising an idler pulley disposed contacting said belt remote from said driving pulley, wherein the spacings between said recording heads are substantially equal to the distance through which said plurality of recording heads are moved by one revolution of both said driving pulley and said idler pulley or to an integral multiple of said distance.

9. The recording apparatus according to claim 6, wherein each of said plurality of recording heads has an ejection port, said recording heads generating film boiling in ink utilizing thermal energy and ejecting the ink through said ejection ports by the growth of bubbles caused by the film boiling.

10. The recording apparatus according to claim 7, wherein each of said plurality of recording heads has an ejection port, said recording heads generating film boiling in ink utilizing thermal energy and ejecting the ink through said ejection ports by the growth of bubbles caused by the film boiling.

11. The recording apparatus according to claim 8, wherein each of said plurality of recording heads has an ejection port, said recording heads generating film boiling in ink utilizing thermal energy and ejecting the ink through said ejection ports by the growth of bubbles caused by the film boiling.

* * * * *

UNITED STATES PATENT AND TRADEMARK OFFICE
CERTIFICATE OF CORRECTION

PATENT NO. : 5,151,716

DATED : September 29, 1992

INVENTOR(S) : Shinji Kanemitsu

It is certified that error appears in the above-identified patent and that said Letters Patent is hereby corrected as shown below:

COLUMN 5:

Line 41, "beads" should read --heads--.

Signed and Sealed this

Ninth Day of November, 1993

Attest:

BRUCE LEHMAN

*Attesting Officer*

*Commissioner of Patents and Trademarks*